Aug. 25, 1959  J. L. LAUER  2,901,672
INTERNAL COMBUSTION ENGINE IGNITION SYSTEMS
Filed Sept. 27, 1957
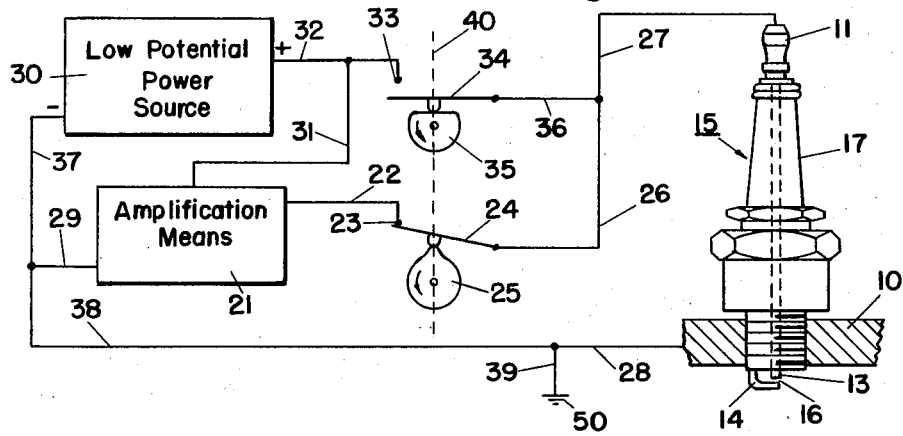
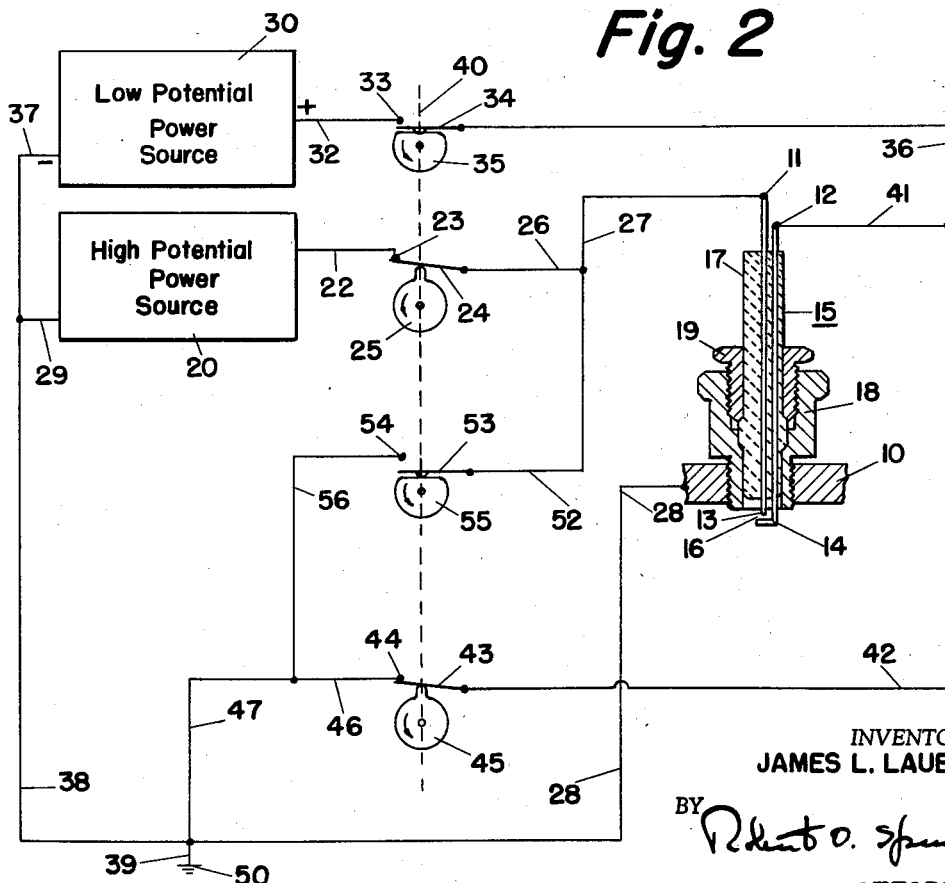
INVENTOR.
JAMES L. LAUER
BY Robert O. Spindle
ATTORNEY

United States Patent Office 2,901,672
Patented Aug. 25, 1959

2,901,672

INTERNAL COMBUSTION ENGINE IGNITION SYSTEMS

James L. Lauer, Philadelphia, Pa., assignor to Sun Oil Company, Philadelphia, Pa., a corporation of New Jersey Application September 27, 1957, Serial No. 686,635

3 Claims. (Cl. 315—226)

This invention relates to a novel method and apparatus for suppressing spark plug fouling in spark ignition internal combustion engines. The invention further relates to improved spark ignition internal combustion engine ignition systems which incorporate such an apparatus for suppressing spark plug fouling.

Spark plug fouling is the term applied to a prevalent problem in spark ignition internal combustion engines which employ a conventional leaded gasoline as fuel. Such fouling is probably caused by the deposition on the spark plugs of decomposition products from the lead antiknock additive agent. These decomposition products either themselves conduct electricity in some manner, or are reduced under combustion chamber conditions to other products which do. A build-up on spark plugs of such decomposition products thus provides an alternate path for spark plug current and results in a shorting out or misfiring of the spark plugs.

Generally, this problem has been attacked by employing various substances as additives in gasolines containing such lead antiknock agents as, for example, tetraethyl lead. Various organo-phosphorus compounds such as tricresyl phosphate, tributyl phosphine and chloropropyl thionophosphate, have been proposed and tested, with widely varying results, as leaded gasoline additives to reduce spark plug fouling and surface ignition. None of the additives heretofore tested has been completely successful in eliminating spark plug fouling, and all of them have exhibited undesirable side effects of one type or another. For example, organo-phosphorus compounds, when present in leaded gasoline in critical amounts, may be converted under combustion chamber conditions to acidic substances which can cause corrosion and deterioration of engine parts, particularly the valves.

Accordingly, one object of this invention is to provide a novel method for suppressing spark plug fouling in spark ignition internal combustion engines. Another object is to provide a novel method for suppressing spark plug fouling which is free from such deleterious side effects as have heretofore been experienced with other proposed methods. Still another object of the invention is to provide a novel apparatus for suppressing spark plug fouling in such engines. A further object is to provide such a novel apparatus as can be incorporated into a conventional ignition system of a spark ignition internal combustion engine.

It has now been discovered that the fouling of spark plugs in a spark ignition internal combustion engine is substantially suppressed by applying a low electromotive potential from a D.C. (direct current) power source across the electrodes of each spark plug of the engine for a limited time during the operating cycle of the engine. According to the invention, the low D.C. electromotive potential so employed is not sufficient in magnitude to cause an electrical discharge, or spark, across the spark gap of the spark plug electrodes, and hence it will not ignite a combustible fuel mixture in contact with the plug. Also, in accordance with the invention, the low D.C. potential is applied to each spark plug during substantially all of the time interval in which the combustible fuel mixture in contact with that spark plug is not being ignited, i.e., when a high tension, oscillating electromotive potential (hereinafter referred to as the "firing potential") which is sufficient to produce an electrical discharge, or spark, across the spark gap of the spark plug electrodes is not being applied.

The low D.C. electromotive potential, or "anti-fouling potential" as it is hereinafter referred to, which is applied across the spark plug electrodes must be sufficient in magnitude to dissociate the electrolytic salts in the deposit on the ceramic insulation of the spark plug, i.e., at least 3 volts, but not sufficient to "fire" the plug, i.e., insufficient to produce such an electrical discharge across the spark gap of the electrodes as will ignite a combustible fuel mixture. Any D.C. electromotive potential of at least 3 volts and which is insufficient to fire any of the spark plugs of an engine is satisfactory. Generally, D.C. electromotive potentials in the range of from about 3 volts to about 30 volts are employed, those in the range of from about 6 volts to about 18 volts being preferred.

The antifouling potential is applied to the spark plug electrodes during substantially all of the time interval in which the firing potential is not being applied such as, for example, within the time interval beginning about 5° (of crank shaft revolution) after the firing potential has been removed and ending about 5° before the firing potential is reapplied.

The polarity of the antifouling potential so applied is preferably such as to make the central spark plug electrode positive with respect to the exterior electrode. An antifouling potential of reversed polarity, i.e., where the central electrode is negative with respect to the exterior electrode, is also effective in suppressing spark plug fouling, but to a lesser extent.

In practicing this invention the antifouling potential can be derived from the same D.C. power source as the firing potential, or it can be derived from an independent D.C. power source. In either case, the apparatus of the invention can be incorporated into the conventional ignition system of a spark ignition internal combustion engine so that such apparatus becomes a permanent part of the ignition system, and effectively suppresses spark plug fouling whenever the engine is operated. When an independent D.C. power source is employed the apparatus of the invention can then be self-contained, i.e., separate and distinct from the engine ignition system. In the latter case, the self-contained spark plug antifouling apparatus can also be employed only periodically such as, for example, whenever the fouled condition of the engine spark plugs requires it. The invention may be more clearly understood from the following detailed description of several embodiments thereof, to be read in conjunction with the accompanying drawing which illustrates these embodiments.

Figures 1 and 2 illustrate the novel method of the invention and its application wherein the apparatus of the invention is incorporated into the conventional ignition system of a spark ignition internal combustion engine. Although the figures illustrate only one spark plug, it is to be understood that the present invention is not so limited, being equally applicable to single or multi-cylinder engines containing one or more spark plugs, respectively.

Figure 1 further illustrates an embodiment wherein the D.C. power source from which the antifouling potential is derived is the same as that from which the firing potential is derived, and where the polarity of the antifouling potential, as applied to the spark plug electrodes, is such that the central electrode is positive with respect to the exterior electrode. Figure 1 thus illustrates the preferred embodiment of the invention.

Figure 2 illustrates an embodiment wherein two independent D.C. power sources are employed, and where the polarity of the antifouling potential is reversed, i.e., such that the central electrode is negative with respect to the exterior electrode.

With reference to Figure 1, 15 is a spark plug positioned in the combustion chamber above at the upper end of a cylinder in an internal combustion engine cylinder block 10. Spark plug 15 of Figure 1 is of conventional design, having central electrode 13 with external terminal 11, said electrode 13 being separated from a second, exterior electrode 14 by ceramic insulation 17. Inside the combustion chamber, the termini of electrodes 13 and 14 are separated by spark gap 16. Power source 30 is any source of a D.C. electromotive potential which, in magnitude, is equal to, or greater than, 3 volts but which is insufficient to fire any spark plug of the engine. As illustrated in Figure 1, power source 30 is to be construed as a conventional storage battery-generator-voltage regulator combination such as is commonly used in spark ignition internal combustion engines. Power source 30 is connected, by line 31, to amplification means 21 which converts the low D.C. potential obtainable from power source 30 into a high intensity, oscillating electromotive potential capable of firing spark plug 15. In this illustration, amplification means 21 is to be construed as including the conventional primary circuit interrupter, or timer, condenser and coil which are common and essential parts of a conventional spark ignition internal combustion engine ignition system. As commonly practiced, the high intensity oscillating potential, or firing potential, is applied to terminal 11 of electrode 13 by connecting means 22, 24, 26 and 27. The firing potential is applied periodically, and for a limited interval of time to the electrodes 13 and 14 by conventional distributor 25, herein illustrated as a cam mounted on shaft 40, which operates hinged connecting means 24 so as to make or break the circuit at fixed contact point 23. Power source 30, amplification means 21 and distributor 25, taken as a whole, together comprise all of the essential elements of the conventional high tension battery and coil ignition system for spark ignition internal combustion engines. These elements so co-operate as to apply periodically, and for a limited interval of time, a high intensity, oscillating electromotive potential across the electrodes 13 and 14 of each spark plug 15 of the engine in a definite sequence, whereby a high intensity electrical discharge, or spark, is produced across the spark gap 16 of the electrodes 13 and 14 at a time suitable for igniting the combustible fuel mixture in contact with said electrodes 13 and 14. The electrical current from the spark is conducted to common ground 50 by way of cylinder block 10 and connecting means 28 and 39. The negative terminal of power source 30 and amplification means 21 are similarly grounded, by way of their respective connecting means 37 and 29, and common connecting means 38 and 39 to common ground 50.

According to the invention as illustrated in Figure 1, the positive pole of power source 30 is also connected to terminal 11 of central electrode 13 by connecting means 32, 34, 36 and 27. Interrupter means 35 is herein illustrated as a cam, mounted on common shaft 40, which functions against hinged connecting means 34 so as to make or break the circuit at the fixed contact point 33. As illustrated in Figure 1, the polarity of the antifouling potential from power source 30 which is applied across the electrodes 13 and 14 of spark plug 15 is such that central electrode 13 is positive with respect to the exterior electrode 14 and the engine cylinder block 10. Also as illustrated, distributor 25 and interrupter means 35 are mounted on a common shaft 40, and are shown as so configured and oriented that they co-operate to apply the antifouling potential during substantially all of the time interval in which the firing potential is not being applied. Operation of the engine employing the novel method, apparatus and improved ignition system of the invention as embodied in Figure 1 results in spark plug fouling being substantially suppressed.

Figure 2 illustrates the embodiment wherein the antifouling potential is derived from an independent power source and is of reversed polarity, i.e., such that the central electrode is negative with respect to the exterior electrode. Elements of Figure 2 which are similar to those in Figure 1 are assigned like reference numerals. Thus, spark plug 15 consists of central electrode 13 and exterior electrode 14, separated by ceramic insulation 17. The inner termini of electrodes 13 and 14 are separated by spark gap 16. However, in contradistinction to the spark plug shown in Figure 1 where the cylinder block 10 forms one terminal (leading to ground) of exterior electrode 14, both electrodes 13 and 14 of Figure 2 are electrically insulated from cylinder block 10 and have external terminals 11 and 12, respectively. Thus, ceramic insulation 17 not only serves to electrically insulate electrodes 13 and 14 from each other, but also insulates both electrodes from the electrically-conducting supporting gland 18, tightening gland 19, and cylinder block 10. The firing potential and antifouling potential circuits are substantially the same as those shown in Figure 1 except for the sources of power and means of grounding. High potential power source 20, which supplies the firing potential, is independent from low potential D.C. power source 30 which supplies the antifouling potential. In Figure 2 power source 20 and conventional distributor 25 are to be construed as together comprising all of the essential elements of a conventional high tension battery and coil ignition system for spark ignition internal combustion engines, including: storage battery-generator-voltage regulator combination, primary circuit interrupter or timer, condenser, coil, and distributor, all of these elements so co-operating as to effect normal ignition as hereinbefore described. Because exterior electrode 14 is now insulated from cylinder block 10, other means are provided for grounding the electrical discharge produced during firing of the plug. Such means consist of connecting means 41, attached to external terminal 12 of electrode 14, and other connecting means 42, 43, 46, 47, and 39 leading to common ground 50. Interrupter means 45 is herein illustrated as a cam, affixed to shaft 40 in common with distributor 25, which is so configured and oriented on shaft 40 as to provide a completed ground circuit, by means of hinged connecting means 43 and fixed contact point 44, only when spark plug 15 is being fired.

The independent low potential D.C. power source 30 is any D.C. power source of at least 3 volts but of sufficiently pow potential so as not to ignite a combustible fuel mixture at spark gap 16 when applied across terminals 13 and 14 of spark plug 15. The antifouling potential derived from power source 30, as illustrated in Figure 2, is of reversed potential from that illustrated in Figure 1 so that central electrode 13 is negative with respect to exterior electrode 14. Therefore the positive pole of the antifouling potential is applied to terminal 12 of exterior electrode 14 by connecting means 32, 34, 36 and 41. Interrupter means 35 constitutes a cam, affixed to common shaft 40, said cam being so configured and oriented on shaft 40 that, when operating against hinged connecting means 34 in conjunction with fixed contact point 33, the antifouling potential is applied during substantially all of the time interval in which the firing potential is not applied to electrodes 13 and 14. Grounding, to common ground 50, of any current flowing during application of the antifouling potential is accomplished by connecting means 27, affixed to external terminal 11 of central electrode 13, and additional connecting means 52, 53, 56, 47 and 39. Interrupter means 55 consists of a cam, attached to common shaft 40, which operates in conjunction with hinged connecting means 53 and fixed contact point 54 so as to make and break the ground circuit corresponding to the application and interruption, respectively, of the antifouling potential. Power sources 20 and 30 are similarly grounded to common ground 50 by their respective connecting means 29 and 37, and common connecting means 38 and 39. The connecting means 37 is connected to the negative terminal of power source 30. As conventionally practiced, cylinder block 10 is also grounded to common ground 50 by connecting means 28 and 39. Practice of the embodiment of the invention illustrated in Figure 2, also results in substantial suppression of spark plug fouling during engine operation.

The novel apparatus of the present invention may be self-contained, i.e., not incorporated permanently into a conventional ignition system for spark ignition engines. When so constituted, the apparatus of the invention can be applied intermittently such as, for example, by a service station, whenever the fouled condition of the spark plugs requires it. According to the invention, such a self-contained apparatus includes at most a low electromotive potential D.C. power source of suitable voltage as hereinbefore described, connecting means for applying the low D.C. potential from such a power source across the electrodes of each spark plug of an engine, and interrupter means for discontinuing the application of the low D.C. potential during the time interval in which each spark plug is being fired. When a common low potential D.C. power source is employed to provide both the antifouling and firing potentials, the novel self-contained apparatus of the invention would include connecting means for applying the low D.C. anti-fouling potential and interrupter means for discontinuing its application, as hereinbefore described.

Although it is not intended that the invention be limited by any theories relative thereto, it is postulated that the leakage of spark plug current, which causes the plug to misfire, is effected by the mechanism of ionic conduction through an alternate electrical path consisting of deposits, on the spark plug insulation, of lead anti-knock compound decomposition products which are partially fused under combustion chamber conditions. Low melting lead halides and oxyhalides are possibly present in such deposits and would support such a conduction mechanism. These relatively low melting compounds are believed to be converted to higher melting compounds such as lead oxides by application of the low D.C. antifouling potential in accordance with the practice of the present invention. Ionic conduction, and consequent spark plug misfiring, are thereby substantially suppressed.

The invention claimed is:

1. Apparatus for suppressing spark plug fouling in a spark ignition internal combustion engine, comprising a unidirectional power source having a voltage insufficient to ignite a combustible fuel mixture when applied across the electrodes of a spark plug in contact with said fuel mixture, a first circuit between said source and the electrodes of at least one spark plug in said engine, a first controllable contact in said circuit, a source of firing potential for said plug, a second circuit between said firing potential source and the electrodes of said plug, a second controllable contact in said second circuit, common means for operating both of said contacts in such a manner that said first contact is closed when said second contact is opened, and vice versa, thereby to connect said unidirectional power source across the electrodes of said plug only when said firing potential source is disconnected therefrom and to disconnect said unidirectional power source from the electrodes of said plug when said firing potential source is connected thereto.

2. Apparatus as defined in claim 1, wherein the closure of said first contact causes the central electrode of said plug to become positive with respect to its exterior electrode.

3. Apparatus as defined in claim 1, wherein the closure of said first contact causes the central electrode of said plug to become negative with respect to its exterior electrode.

References Cited in the file of this patent

UNITED STATES PATENTS 1,745,830    Bethenod _____ Feb. 2, 1930